Patented Dec. 15, 1936

2,063,891

UNITED STATES PATENT OFFICE 2,063,891

MANUFACTURE OF CHLORHYDRINS AND THEIR ETHERS

Henry Dreyfus, London, England

No Drawing. Application June 17, 1933, Serial No. 676,333. In Great Britain July 15, 1932

7 Claims. (Cl. 260—151)

This invention relates to the manufacture of organic compounds and more particularly the manufacture of chlorhydrins from di- or other polyhydric alcohols.

It has been found that an improved manufacture of chlorhydrins may be obtained by reacting on a di- or other polyhydric alcohol with hydrochloric acid generated in the presence of the said alcohol. Thus glycol may be treated so as to yield ethylene chlorhydrin and glycerol treated so as to yield mono- and di-chlorhydrins. Chlorhydrins of other polyhydric alcohols, e. g. erythritol, manitol or polyglycerols, may likewise be obtained.

Any suitable method may be adopted for the generation of the hydrogen chloride. It is preferably formed by the action of an acid upon a chloride, for example sodium chloride. Preferably mineral acids are used, for example sulphuric acid or phosphoric acid. Other chlorides which may be employed are potassium chloride and calcium or barium chloride, and such chlorides may form with the reacting acids salts which may or may not be water-soluble. The reaction mixture may also contain other substances which facilitate the reaction or improve the yield. Thus for example acetic acid may be employed in quantities up to about 10% (preferably 1-2%) calculated on the weight of the polyhydric alcohol. The reaction may be carried out under pressure, or, again, a reflux apparatus may be employed. Means are preferably employed to bring about agitation of the reactants during chlorination, e. g. by the use of mechanical stirring devices. When the reaction is effected under pressure relatively low pressures are in general preferable, e. g. pressures of 2-3 atmospheres.

When the hydrogen chloride is generated by introducing sulphuric or other acid into a vessel containing the polyhydric alcohol and a suitable chloride, addition of the acid is preferably carried out gradually, and in the case of a reaction carried out under pressure a suitable device should be employed which will prevent any substantial loss of pressure during introduction of the acid.

Preferably hydrogen chloride is generated in the reaction mixture by the gradual introduction of sulphuric acid into the vessel containing the polyhydric alcohol and sodium chloride or other suitable chloride. In general it is desirable to carry out the earlier stages of the reaction at a relatively low temperature, e. g. 50–60° or 70° C., and during the later stages of the reaction, e. g. when sufficient acid has been added to evolve the quantity of hydrogen chloride necessary to effect the desired degree of chlorination, gradually to raise the temperature and complete the reaction at a higher temperature, e. g. 100–110° C. or more.

On completion of the reaction the mixture may be distilled at ordinary pressure to remove water and other volatile constituents and then fractionally distilled under reduced pressure in order to obtain the chlorhydrins. Thus glycerol monochlorhydrin may be collected between 114–120° C. at 14 mm. pressure. If desired the whole distillation may be effected under reduced pressure. Any acid present in the reaction mixture may be neutralized before fractionation e. g. by means of sodium carbonate, and insoluble matter may be separated, e. g. by filtration.

The invention also includes the further treatment of the chlorinated compounds so as to yield the chlorhydrin ethers. Thus the reaction medium obtained after production of the chlorhydrins may be raised to a higher temperature, e. g. 200–250° C., and heated for several hours, and on completion of the reaction the reaction product may be fractionated, preferably under reduced pressure, to separate the chlorhydrin ether formed. Preferably the reaction is effected in the presence of a suitable condensing agent, e. g. sulphuric or hydrochloric acid, though if excess hydrochloric acid is present on completion of the reaction for the manufacture of the chlorhydrins formation of the ethers may be carried out at the higher temperature without the addition of further condensing agent. Alternatively the chlorhydrins may be partially or completely separated from other substances, e. g. by filtration and/or fractional distillation, before carrying out the process for the production of the ethers.

The following examples are given in order to illustrate the invention, but it is to be clearly understood that the invention is not limited in any way thereto.

Example 1

180 parts by weight of sodium chloride, 250 parts by weight of glycerol and 5 parts by weight of glacial acetic acid are introduced into an autoclave fitted with a stirrer and a pressure gauge. The temperature is raised to about 50 to 60° C. and 90% sulphuric acid is slowly introduced through a suitable device adapted to prevent loss of pressure, the rate of introduction of the acid being regulated so as to maintain the pressure at about 1½-2 atmospheres absolute. When sufficient acid has been introduced to convert all the sodium chloride to sodium sulphate, the addition of acid is stopped and the temperature is gradually raised to 100°–110° C. and maintained at that temperature for about 2–3 hours. During the progress of the reaction the contents of the autoclave are well stirred. On completion of the reaction, the reaction liquors may be fractionated and the mono-chlorhydrin collected between 114–120° C. at a pressure of 14 mm.

*Example 2*

Equal weights of glycol and sodium chloride are introduced into an autoclave, and chlorination of the glycol is carried out as described in the preceding example.

*Example 3*

The following example describes the production of the chlorhydrin ether from the ethylene chlorhydrin obtained according to Example 2. The reaction liquors obtained on the completion of the reaction according to Example 2 are heated with about 6% of sulphuric acid, calculated on the weight of glycol originally employed, the temperature being raised slowly to about 200 to 250° C. and maintained at that point for about 3 hours. The reaction liquors are then separated by fractional distillation.

What I claim and desire to secure by Letters Patent is:—

1. Process for the manufacture of an ether of a chlorhydrin, which comprises reacting a polyhydric alcohol with hydrogen chloride generated in the presence of said alcohol, maintaining the temperature at 50° to 70° C. during generation of the hydrogen chloride, thereafter raising the temperature gradually to 200° to 250° C. and maintaining the reaction mixture at this temperature for several hours.

2. Process for the manufacture of a chlorhydrin ether of glycerol, which comprises reacting glycerol with hydrogen chloride generated in the presence of said glycerol, maintaining the temperature at 50 to 70° C. during generation of the hydrogen chloride, thereafter raising the temperature gradually to 200 to 250° C. and maintaining the reaction mixture at this temperature for several hours.

3. Process for the manufacture of a chlorhydrin ether of glycol, which comprises reacting glycol with hydrogen chloride generated in the presence of said glycol, maintaining the temperature at 50 to 70° C. during generation of the hydrogen chloride, thereafter raising the temperature gradually to 200 to 250° C. and maintaining the reaction mixture at this temperature for several hours.

4. Process for the manufacture of a chlorhydrin ether of glycerol, which comprises reacting glycerol with hydrogen chloride generated by the reaction of sulphuric acid and a metal chloride in the presence of said glycerol, maintaining the temperature at 50 to 70° C. during generation of the hydrogen chloride, thereafter raising the temperature gradually to 200 to 250° C. and maintaining the reaction mixture at this temperature for several hours.

5. Process for the manufacture of a chlorhydrin ether of glycol, which comprises reacting glycol with hydrogen chloride generated by the reaction of sulphuric acid and a metal chloride in the presence of said glycol, maintaining the temperature at 50 to 70° C. during generation of the hydrogen chloride, thereafter raising the temperature gradually to 200 to 250° C. and maintaining the reaction mixture at this temperature for several hours.

6. Process for the manufacture of a chlorhydrin ether of glycerol, which comprises reacting in a closed vessel glycerol with hydrogen chloride generated by the reaction of sulphuric acid and sodium chloride in the presence of said glycerol, maintaining the temperature at 50 to 70° C. during generation of the hydrogen chloride, thereafter raising the temperature gradually to 200 to 250° C. and maintaining the reaction mixture at this temperature for several hours.

7. Process for the manufacture of a chlorhydrin ether of glycol, which comprises reacting in a closed vessel glycol with hydrogen chloride generated by the reaction of sulphuric acid and sodium chloride in the presence of said glycol, maintaining the temperature at 50 to 70° C. during generation of the hydrogen chloride, thereafter raising the temperature gradually to 200 to 250° C. and maintaining the reaction mixture at this temperature for several hours.

HENRY DREYFUS.